United States Patent
Dudda et al.

(10) Patent No.: US 11,304,251 B2
(45) Date of Patent: Apr. 12, 2022

(54) TRANSMITTING AND RECEIVING A DATA UNIT

(71) Applicant: Telefonaktiebolaget LM Ericsson (publ), Stockholm (SE)

(72) Inventors: Torsten Dudda, Aachen (DE); Marek Sobe, Dresden (DE); John Camilo Solano Arenas, Neuss (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 11 days.

(21) Appl. No.: 16/766,908

(22) PCT Filed: Dec. 11, 2018

(86) PCT No.: PCT/EP2018/084407
§ 371 (c)(1),
(2) Date: May 26, 2020

(87) PCT Pub. No.: WO2019/137721
PCT Pub. Date: Jul. 18, 2019

(65) Prior Publication Data
US 2020/0374955 A1 Nov. 26, 2020

Related U.S. Application Data

(60) Provisional application No. 62/615,629, filed on Jan. 10, 2018.

(51) Int. Cl.
*H04W 76/15* (2018.01)
*H04L 1/08* (2006.01)
(Continued)

(52) U.S. Cl.
CPC .............. *H04W 76/15* (2018.02); *H04L 1/08* (2013.01); *H04W 28/0236* (2013.01); *H04W 80/02* (2013.01)

(58) Field of Classification Search
CPC ...... H04W 76/15; H04W 28/0236; H04L 1/08
See application file for complete search history.

(56) References Cited

U.S. PATENT DOCUMENTS

2016/0104793 A1\* 4/2016 Ching ............... H01L 29/78696
257/347
2017/0331577 A1\* 11/2017 Parkvall .................. H04W 8/18
(Continued)

FOREIGN PATENT DOCUMENTS

WO  2017182927 A1  10/2017

OTHER PUBLICATIONS

Huawei et al., "Discussion on Packet Duplication", 3GPP TSG-RAN2 Meeting #99bis, Prague, Czech Republic, Oct. 9, 2017, pp. 1-4, R2-1711115, 3GPP.
(Continued)

*Primary Examiner* — Gary Mui
(74) *Attorney, Agent, or Firm* — Coats & Bennett, PLLC

(57) ABSTRACT

Examples disclosed herein include a method performed by a wireless device for transmitting a Packet Data Convergence Protocol (PDCP) protocol data unit (PDU). The method comprises selecting one or both of a first path and a second path for transmitting the PDU to a destination based on a comparison of a first delay on the first path and a second delay on the second path, wherein the first delay includes a queueing delay and/or a processing delay on the first path, and/or the second delay includes a queueing delay and/or a processing delay on the second path. If both the first path and the second path are selected, the method comprises using carrier aggregation (CA) or dual connectivity (DC) to send the PDU to the destination on the first path using a first carrier and sending a duplicate of the PDU to the destination on the second path using a second carrier.

18 Claims, 10 Drawing Sheets

---

VV02
Selecting one or both of a first path and a second path for transmitting the data unit to a destination based on a comparison of a first delay on the first path and a second delay on the second path VV04
If both the first path and the second path are selected, sending the data unit to the destination using the first path and sending a duplicate of the data unit to the destination using the second path

(51) Int. Cl.
*H04W 28/02* (2009.01)
*H04W 80/02* (2009.01)

(56) References Cited

U.S. PATENT DOCUMENTS

| | | | |
|---|---|---|---|
| 2019/0098640 A1* | 3/2019 | Holakouei | H04W 28/0236 |
| 2019/0174353 A1* | 6/2019 | Yilmaz | H04W 28/0278 |
| 2019/0200251 A1* | 6/2019 | Shi | H04W 76/00 |
| 2019/0357137 A1* | 11/2019 | Shah | H04W 80/08 |
| 2021/0045150 A1* | 2/2021 | Kim | H04L 1/1854 |

OTHER PUBLICATIONS

Ericsson, "PDCP Duplication and Discard", 3GPP TSG-RAN WG2 #100, Reno, USA, Nov. 27, 2017, pp. 1-3, R2-1712926, 3GPP.

ZTE, "Consideration on the LCP for Data Duplication", 3GPP TSG-RAN WG2 Meeting #98, Hangzhou, China, May 15, 2017, pp. 1-5, R2-1704666, 3GPP.

3rd Generation Partnership Project, "3rd Generation Partnership Project; Technical Specification Group Radio Access Network; NR; NR and NG-RAN Overall Description; Stage 2 (Release 15)", Technical Specification, 3GPP TS 38.300 V1.3.0, Dec. 1, 2017, pp. 1-68, 3GPP.

\* cited by examiner

TRANSMITTING AND RECEIVING A DATA UNIT

TECHNICAL FIELD

Examples disclosed herein relate to transmitting and receiving a data unit, such as for example a Packet Data Convergence Protocol (PDCP) protocol data unit (PDU).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present application is discussed within the example context of 3GPP New Radio (NR) radio technology (3GPP TS 38.300 V1.3.0 (2017 December)), which incorporated herein by reference in its entirety for all purposes. It should be understood that the problems and solutions described herein are equally applicable to, for example, wireless access networks and user-equipments (UEs) implementing other access technologies and standards. NR is used as an example technology where embodiments are suitable. However, embodiments are applicable also to 3GPP LTE, 3GPP LTE and NR integration, also denoted as non-standalone NR, and/or other technologies.

For NR, the dual connectivity (DC) protocol architecture of a split bearer is specified, building on the protocol architecture used for LTE for the DC split bearer. In DC the UE is connected to two distinct radio nodes. The UE maintains a packet data convergence protocol (PDCP) entity for the split bearer connected to multiple (two) radio link control (RLC) and medium access control (MAC) entities, as well as physical layer entities (PHY). These are each associated to a cell group, the master cell group and secondary cell group respectively. Transmission via the master cell group goes to the Master gNB (eNB in LTE terminology), MgNB; transmission via the secondary cell group goes to the Secondary gNB (eNB in LTE terminology), SgNB. The MgNB and SgNB maintain their own RLC and MAC entities associated to this single split bearer. A further node or function, packet processing function (PPF), which may be separate or collocated with MgNB or SgNB, terminates the PDCP protocol on the network side. In this functional split, the centralized unit terminating PDCP may also be called a centralized unit (CU) while the remaining nodes implementing the protocol layers below PDCP may be denoted distributed units (DUs). In DC, data units on PDCP may be routed ("split") via either lower layer or duplicated via both as further described below.

Furthermore, for NR, the carrier aggregation (CA) protocol architecture is specified. In carrier aggregation, the UE is connected to one radio node (e.g. eNB, gNB) via multiple (e.g. two) carriers, i.e. maintains two physical layers (PHY) to one radio node. Besides this, the protocol stack consists of one MAC, RLC, PDCP. This way, in CA, on MAC, data units to be transmitted may be routed via both carriers. An exception is packet duplication, where the protocol stack entails two RLC logical channels, to which PDCP routes duplicates, and where transmission of each RLC is done one a separate carrier by MAC.

Generally, when packet duplication is configured for a radio bearer by radio resource control (RRC), an additional RLC entity and an additional logical channel are added to the radio bearer to handle the duplicated PDCP PDUs. Duplication at PDCP therefore consists in sending the same PDCP PDUs twice: once on the original RLC entity and a second time on the additional RLC entity. With two independent transmission paths, packet duplication may therefore increase reliability and reduces latency and is especially beneficial for ultra-reliable low latency (URLLC) services. When duplication occurs, the original PDCP PDU and the corresponding duplicate shall not be transmitted on the same carrier. The two different logical channels can either belong to the same MAC entity (CA) or to different ones (DC). In the former case, logical channel mapping restrictions are used in MAC to ensure that the logical channel carrying the original PDCP PDUs and logical channel carrying the corresponding duplicates are not sent on the same carrier. Once configured, duplication can be activated and de-activated per data radio bearer (DRB) by means of a MAC control element (CE).

SUMMARY

There currently exist certain challenge(s). For example, while packet duplication provides high reliability for a data transmission with a certain target latency, it constitutes also a significant overhead, given that double the radio resources are required for transmission. It is currently unclear how a network can efficiently implement activation and deactivation of duplication.

Certain aspects of the present disclosure and their embodiments may provide solutions to these or other challenges. For example, certain embodiments provide a method to handle or control data unit (e.g. packet) duplication involving a transmitter deciding to transmit on a first transmission path only, on the second transmission path only, to send duplicates via the first path only, the second path only or via both paths. As a decision basis, data unit (e.g. packet) delay history, latency in terms of midhaul delay, queueing delays in respective lower layer protocols, and/or HARQ (average) transmission and retransmission delays can be considered, for example fed back to the transmitting entity.

There are, proposed herein, various embodiments which address one or more of the issues disclosed herein. For example, in one aspect, embodiments of this disclosure provide a method performed by a wireless device for transmitting a Packet Data Convergence Protocol (PDCP) protocol data unit (PDU). The method comprises selecting one or both of a first path and a second path for transmitting the PDU to a destination based on a comparison of a first delay on the first path and a second delay on the second path, wherein the first delay includes a queueing delay and/or a processing delay on the first path, and/or the second delay includes a queueing delay and/or a processing delay on the second path. If both the first path and the second path are selected, the method comprises using carrier aggregation (CA) or dual connectivity (DC) to send the PDU to the destination on the first path using a first carrier and sending a duplicate of the PDU to the destination on the second path using a second carrier.

According to a further aspect a wireless device for transmitting a Packet Data Convergence Protocol (PDCP) protocol data unit (PDU) is provided. The wireless device is configured to select one or both of a first path and a second path for transmitting the PDU to a destination based on a comparison of a first delay on the first path and a second delay on the second path, wherein the first delay includes a queueing delay and/or a processing delay on the first path, and/or the second delay includes a queueing delay and/or a processing delay on the second path. If both the first path and the second path are selected, use Carrier Aggregation (CA) or Dual Connectivity (DC) to send the PDU to the destination on the first path using a first carrier and sending a duplicate of the PDU to the destination on the second path using a second carrier.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
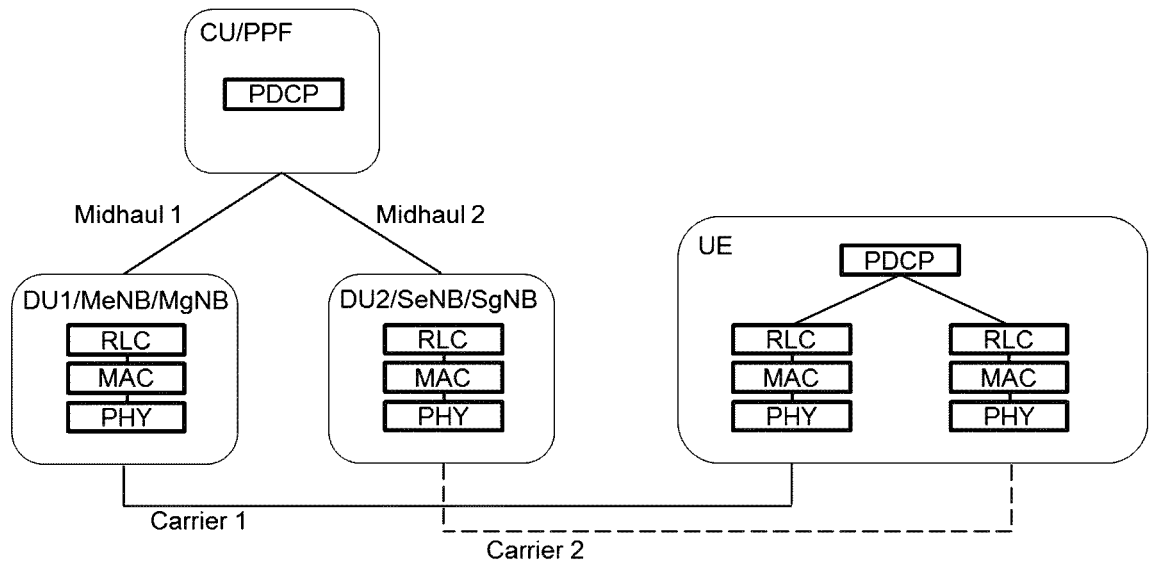
FIG. 1 shows the Dual Connectivity (DC) architecture in 3GPP New Radio (NR)

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Certain embodiments may provide one or more of the following technical advantage(s). For example, data unit (e.g. packet) duplication can be controlled or handled more efficiently, e.g. this reliability enhancing and/or latency reducing method may be used only when necessary, desirable or when data unit (e.g. packet) duplication will provide a desired enhancement. Additionally or alternatively, the data unit (e.g. packet) duplication may be performed via a node providing the highest gains, rather than in a static mode which would consume more radio resources. This way, radio resource capacity is used efficiently.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain embodiments disclosed herein consider the transmission delay on each of multiple paths between a transmitter and a destination (e.g. a receiver, or a destination via a receiver). For example, the multiple paths may be via different carriers, such as e.g. with CA or DC. If the difference in delay on each of the paths is large, for example above a predetermined time period, proportion, or threshold, then a data unit may be sent on one of the paths, such as the lowest delay path. If the difference is small, for example below a predetermined time period, proportion, or threshold, then the data unit may be sent on both paths. That is, the data unit may be sent on the first path, and a duplicate of the data unit may also be sent on the second path.

For example, a method performed by a wireless device for transmitting a data unit may comprise selecting one or both of a first path and a second path for transmitting the data unit to a destination based on a comparison of a first delay on the first path and a second delay on the second path and, if both the first path and the second path are selected, sending the data unit to the destination using the first path and sending a duplicate of the data unit to the destination using the second path. In this way, for example, the delays of both paths (e.g. the relative delays) may be considered when determining whether to send duplicate data units.

The delay on a path may be a transmission delay, e.g. the time between transmission of a data unit from the source (e.g. wireless device) and its arrival at the destination (which may be the ultimate destination of the data unit, such as an IP address or MAC address, or may be an intermediate node such as a base station, router, centralized unit, distributed unit, or any other node).

In some examples, at least part of the first path and the second path use different physical layers and/or different carriers. Therefore, for example, the two paths may be different paths in carrier aggregation (CA) or dual connectivity (DC). As such, therefore, for example, the two paths may be different physical layer paths (e.g. different carriers) to a single base station, such as an eNB or gNB, or may be paths to different base stations, such as eNBs and/or gNBs. The method may comprise transmitting the data unit using a first carrier or a first physical layer, and sending a duplicate of the data unit comprises transmitting a duplicate of the data unit using a second carrier or a second physical layer.

In some examples, a third path to the destination may be considered. For example, in a wireless device using dual connectivity (DC), the device may decide to send the data unit using one, but not both, of the first path and the second path. The selected path may be for example via a node such as a base station (e.g. eNB or gNB). The third path may also be via the node, and hence in some examples the third path and the selected first or second path may use different carriers to a base station, i.e. aggregated carriers in Carrier Aggregation (CA). The wireless device may then decide, using the same, similar or different criteria to the selection of whether to use the first and/or second path, whether to use the third path in place of or in addition to the selected first or second path (e.g. whether to send duplicate data units to the base station over different carriers). For example, the delays on each of the third path and the selected one of the first and second path may be considered. For example, the method comprises, if one of the first path and the second path is selected, selecting one or both of a third path and the selected one of the first path and the second path for transmitting the data unit to the destination based on a comparison of a third delay on the third path and a selected path delay on the selected one of the first path and the second path. In some examples, the method may comprise selecting both the third path and the selected one of the first path and the second path if a difference between the third delay and the selected path delay is less than a further predetermined time difference or a further predetermined threshold, and selecting one of the third path and the selected one of the first path and the second path if the difference between the third delay and the selected path delay is greater than the further predetermined time difference or the further predetermined threshold. In other words, for example, if the difference in delays on the first and second paths via different base stations are large (e.g. above a threshold, proportion or predetermined amount), and only one of these paths is selected for transmission of the data unit, the wireless device may determine to send the data unit via the selected path and/or the third path (e.g. may decide whether to send duplicate data units) based on a comparison of the delays on the selected path and the third path. In any example, however, where only one path of two paths is selected, the wireless device may for example send the data unit using the path with the lower delay.

In some examples, the first delay includes an estimate of delay on the first path due to retransmissions (e.g. RLC or HARQ retransmissions) on the first path, and the second delay includes an estimate of delay on the second path due to retransmissions on the second path. Therefore, for example, the delays may reflect an expected number (e.g. average, or probability) of retransmissions for a data unit. For example, the delay on a path may comprise the time period between transmission of a data unit and reception at the destination, plus an expected number of retransmissions multiplied by the round trip time (RTT) for a retransmission (e.g. the time taken for a HARQ NACK to reach the wireless device and be decoded, plus the time taken for the retransmission to be transmitted by the wireless device and reach the destination). The expected number of retransmissions may or may not be an integer. This delay may be determined for each path independently. In some examples, the method comprises determining the estimate of delay on the first path based on an average number of retransmissions for data units on the first path during a first time period, and determining the estimate of delay on the second path based on an average number of retransmissions for data units on the second path during a second time period.

In other examples, the combined probability or expected number of retransmissions for both paths may be included in the delay for both paths. Therefore, for example, the method comprises determining the first delay and the second delay based on an average number of retransmissions for data units on the first path and the second path during a first time period.

In some examples, the wireless device may determine the first delay and/or the second delay based on feedback from the destination and/or one or more intermediate nodes between the wireless device and the destination. For example, the wireless device may receive the feedback from for example an eNB or gNB, and/or any other node in the first and second path. In some examples, the feedback may indicate the delay, or may include information that the wireless device may use to calculate the delay. In some examples, the feedback may be received from or via a RLC or PDCP layer, e.g. from a RLC or PDCP entity in the wireless device, the destination, an eNB or gNB, or any node in the first or second path.

In some examples, the decision whether to send duplicate packets may be made by any entity, which may or may not be the wireless device or an entity within the wireless device.

In some embodiments, an indication of respective communication quality over the first path and the second path may be used to determine whether to send duplicate data units. For example, if only the first path is selected, but the second path has a better communication quality (e.g. higher SNR, higher SINR, lower BLER or other signal quality or communication reliability metric), the wireless device may nevertheless send a duplicate data unit over the second path, despite the difference in delays between the paths being e.g. larger than a threshold, proportion or predetermined amount. Some examples use SINR as the quality metric, though any other suitable signal quality or communication reliability metric can be used instead. Therefore, for example, the method may comprise estimating a first SINR for the first path and a second SINR for the second path, and if one of the first path and the second path is selected (e.g. sending a duplicate data unit was not initially decided), if the first path is selected, sending a duplicate of the data unit on the second path if the first SINR is lower than the second SINR, and if the second path is selected, sending a duplicate of the data unit on the first path if the first SINR is higher than the second SINR. In some examples, therefore, sending a duplicate data unit on the non-selected path may improve communication reliability, even though the difference in delay between the selected path and the non-selected path may be large.

In some examples, the method may comprise, if one of the first path and the second path is selected, sending the data unit to the destination using the selected one of the first path and the second path. Therefore, for example, a duplicate data unit may not be sent using the non-selected path, though in some examples the duplicate packet may still be sent (e.g. on a later decision as suggested above, based on quality of the paths, delay on a third path and so on).

In some examples, the first delay is an estimated delay on the first path and/or the second delay is an estimated delay on the second path. In other examples, the first and second delays may be measured and/or may be an average delay for data units on the first and second paths respectively, such as for example during a predetermined time period.

The data unit may in some examples comprise a PDCP PDU, packet, IP packet, frame or any other data unit.

In some examples, a method performed by a base station for receiving a data unit comprises, based on a comparison of a first delay on a first path and a second delay on a second path, receiving the data unit from a wireless device on one of the first path and the second path, or receiving the data unit from the wireless device on the first path and receiving a duplicate of the data unit on the second path. Therefore, the base station (e.g. an eNB or gNB) may receive a data unit over one path or both paths (i.e. data unit duplication) based on the first and second delays.

For example, the method may comprises receiving the data unit on the first path and receiving a duplicate of the data unit on the second path if a difference between the first delay and the second delay is less than a predetermined time difference or a predetermined threshold, and receiving the data unit on one of the first path and the second path if the difference between the first delay and the second delay is greater than the predetermined time difference or the predetermined threshold. Where the data unit is received over one path, the path over which the data unit is received may be the path with the lower delay.

Below are presented particular specific example embodiments.

FIG. 1 shows the Dual Connectivity (DC) architecture in 3GPP NR (also applicable for LTE) in which packet duplication may be used.

Figure 2:
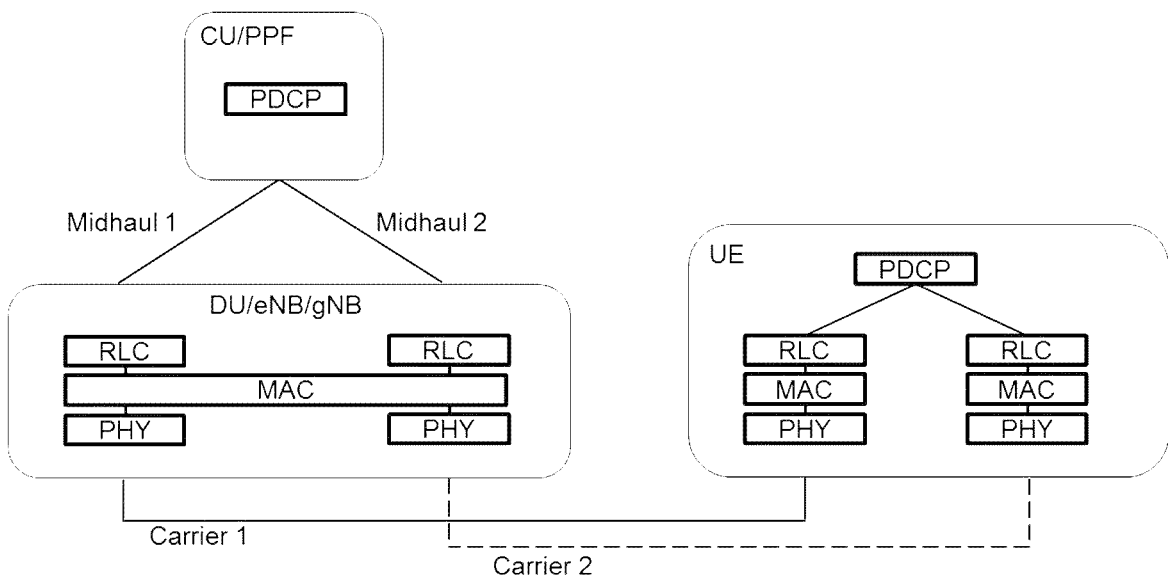
FIG. 2 shows the Carrier Aggregation (CA) architecture in 3GPP NR.

FIG. 2 shows the Carrier Aggregation (CA) architecture in 3GPP NR (also applicable for LTE) in which packet duplication may be used.

First Specific Embodiment

The first specific embodiment is a method in which the transmitter efficiently decides to transmit a PDCP PDU either via only one transmission path or via two transmission paths, i.e. a duplicate transmission, as described below. For that, the following transmission latencies/delays related to a packet available for transmission at the PDCP layer, i.e. a PDCP protocol data unit (PDU), are defined:

d_PDCP_PDU is the transmission delay of a PDCP PDU from the point where it becomes available at PDCP until it is delivered successfully by lower layers at the receiver. This way the delay includes:
  Queueing delay at PDCP
  Processing delay at PDCP (e.g. encoding of PDCP SDU to PDCP PDU)
  Queueing and transmission delay on the midhaul, if present
  Queueing delays at RLC transmitter
  Processing delay at RLC (e.g. encoding of RLC SDU to RLC PDU)
  RLC Retransmission delay/round trip time, if transmission was not successful
  HARQ encoding and transmission delay (MAC and PHY layer)
  HARQ retransmission delay/round trip time, if HARQ transmission not successful Example of typical values for LTE system: about 4 ms are required for encoding and transmission of data. For each failed HARQ transmission (NACK received) an additional 8 ms HARQ RTT are added. By observing previous transmission attempts, an average delay or statistical distribution (HARQ transmissions+x HARQ retransmissions) for a successful transmission can be provided. x may or may not be an integer. So, for example, the average number of HARQ retransmissions may be 0.25 (i.e. one retransmission for every four transmissions, or two retransmissions or every eight transmissions, etc.), though this is merely an illustrative example, and x can be any positive number or zero.

It is noted that additional receiver specific delays may occur at the receiver, which would constitute the "SDU" specific transmission delay, for example a reordering delay, or further decoding delays. These delays are not considered here though, since they delays apply to both transmission of original packet and duplicate packet in the same way, and may thus be irrelevant for the comparison of those delays.

d_PDCP_PDU_p1 and d_PDCP_PDU_p2 are the delays via transmission path 1 and transmission path 2, respectively. In the following definition of the transmission decisions, path 1 refers to the master cell group transmission path for the case of DC architecture or the transmission path via the first available carrier for the case of CA architecture. Likewise, path 2 refers to the secondary cell group transmission path for the case of DC architecture or the transmission path via the second available carrier for the case of CA architecture.

In an example, it is assumed that transmission of original PDCP PDU as well as its potential duplicate from PDCP happens at the same time. Therefore, for the below decision to duplicate or not, transmission delays are considered. If transmission of original and duplicate are not occurring at the same time, instead of delays, the absolute time of reception are original and duplicate are considered in the comparison below. Or, in other examples, the delay for a path may include the delay before a data unit (e.g. original or duplicate data unit or packet) is transmitted, and hence the delays for the paths may reflect the different times of transmission on each path.

The decision to transmit either via path 1 (also called M) or path 2 (also called S) or to duplicate among both paths (1 and 2, also called MS), considers the configurable maximum transmission difference parameter β, where β is a configurable variable based on the HARQ feedback (processing) timing in terms of transmission time intervals (TTI) or seconds/milliseconds. For instance, but not restricting, assuming n+4 HARQ feedback timing, as typical in LTE, β may be defined as: 0<β<4*TTI.

MS decision: duplicate among both transmission paths, i.e. path 1 and path 2. This decision is taken when the difference of the delays among the paths is smaller than β, i.e. |d_PDCP_PDU_p1−d_PDCP_PDU_p2|<β.
  M decision: only via path 1. This decision is taken when the difference of the delays among the paths is greater or equal β, and the delay of path 1 smaller than path 2. i.e. |d_PDCP_PDU_p1−d_PDCP_PDU_p2|>=β & d_PDCP_PDU_p1<d_PDCP_PDU_p2.
  S decision: only via path 2. This decision is taken when the difference of the delays among the paths is greater or equal β, and the delay of path 1 greater or equal path 2. i.e. |d_PDCP_PDU_p1−d_PDCP_PDU_p2|>=β & d_PDCP_PDU_p1>=d_PDCP_PDU_p2.

It is noted that to increase reliability, packet transmission repetition in time in each transmission path may be applied. This way, a (time-based) duplication happens within one path. For example in this case, one would defer from the MS decision depending for example on signal to interference plus noise ratio (SINR) or block error rate (BLER) and whether the repetition scheme is configured for one of the paths.

In some examples, the estimation of the transmission delays by the transmitter at PDCP are based on the data available for transmission in PDCP and RLC (of both paths). For that, the flow control mechanism to be implemented in the midhaul between PDCP and RLC of both paths may include as feedback information one or more of the RLC buffer size, RLC queueing delay, RLC retransmission delay, outgoing data rate, configured encoding/transmission times/round trip times (TTI length, OFDM numerology), as well as observed statistical values of the HARQ delay (including transmission delay and potentially multiple HARQ retransmission delays), described further in the additional embodiment below.

In an additional embodiment, the transmitter can consider the HARQ performance for each path separately. Therefore, the transmitter tracks the HARQ feedback (ACK/NACK) over a defined span of transmissions to subsequently estimate the HARQ transmission performance, i.e. estimate the HARQ error probability of upcoming transmissions based on the number of received ACKs and NACKs in the previous monitoring period. This can be converted to an additional HARQ transmission delay for the successful packet transmission. Thereby, the transmitter takes also into account this additional HARQ transmission delay in d_PDCP_PDU to make the decision of duplicate transmission or selecting a single transmission path. This comprises that MAC/HARQ provides to upper layers the HARQ transmission delay to be included in the feedback information to be transmitted to PDCP via the midhaul.

As a further embodiment, the transmitter furthermore makes the transmission decision based on the BLER performance related to the SINR of the receiver regarding the control and data transmission. Thus, the transmitter further estimates the receiver's SINR for each one of the transmission paths. Therefore, for example, for the case of an M decision or S decision, if the transmitter finds that the non-selected transmission path may provide an estimated receiver's SNR, SINR and/or BLER that is more favorable (e.g. higher SNR, higher SINR and/or lower BLER) than the selected path, the transmitter then decides a duplicate transmission, i.e. MS decision. In some examples, this comprises that lower layers provides an estimated receiver's SNR, SINR and/or BLER in the feedback information to be transmitted to PDCP via the midhaul.

Figure 3:
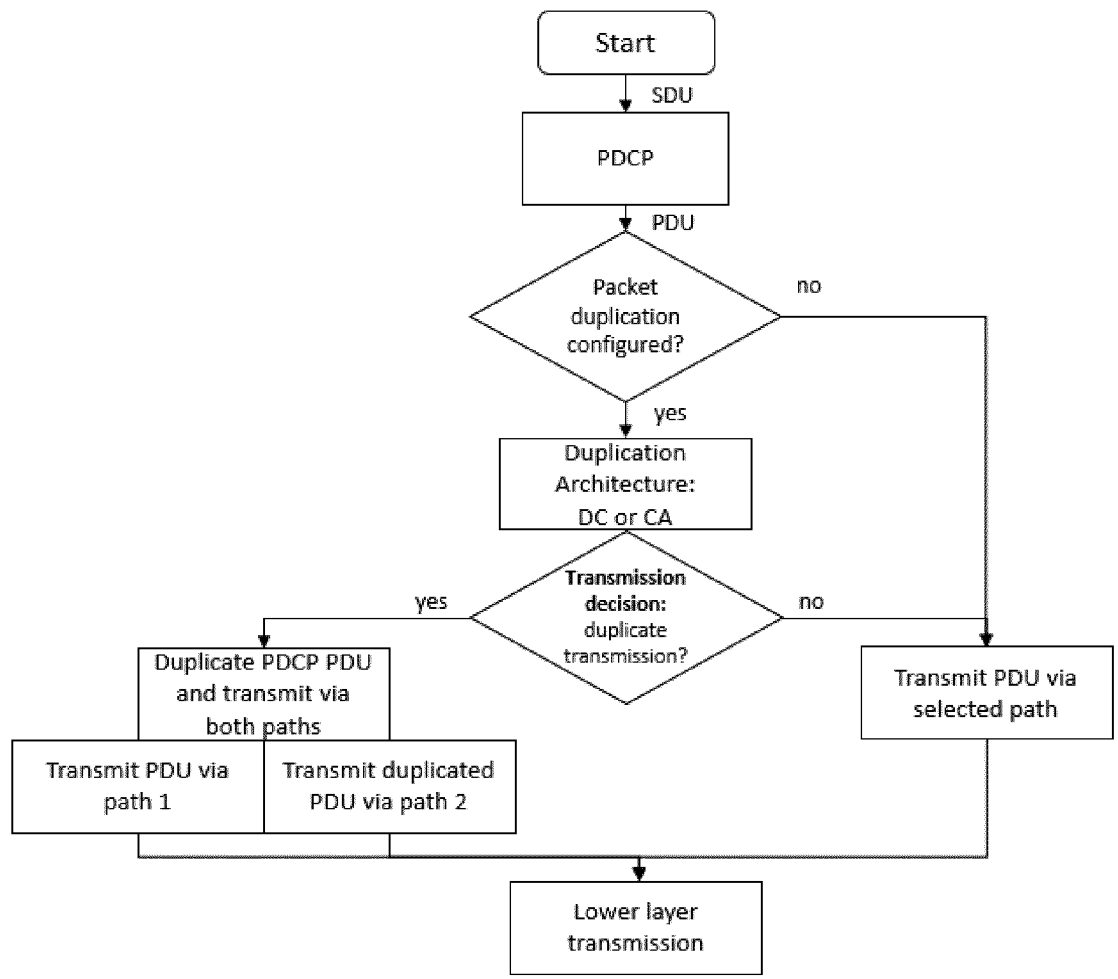
FIG. 3 depicts an example of a data flow diagram considering PDCP packet duplication.

FIG. 3 depicts an example of the data flow diagram considering PDCP packet duplication.

In another embodiment, a DC+CA architecture is also configured for packet duplication. For this case, the transmitter initially considers the DC case and decides if a PDCP PDU is transmitted via a single transmission path, i.e. via the master cell group or the secondary cell group, or via both paths, i.e. duplicate transmission. If only one single path is selected, the transmitter may decide a duplicate transmission via CA, i.e. via two available carriers from the selected path of the DC architecture. This may comprise also to make a transmission decision for the two available carriers, as described above, or to make always the decision of a duplicate transmission.

Some examples are described above with reference to LTE and/or NR/5G, though any example can be applied to any technology or technologies where appropriate. Furthermore, where packets are referred to, any data unit may be used or considered instead. In any of the examples or embodiments described herein, where an action or decision is taken as a result of one quantity being less than or greater than another quantity, the same action or decision may be taken in an alternative example where the quantity is less than or equal to, or greater than or equal to, the other quantity respectively.

Figure 4:
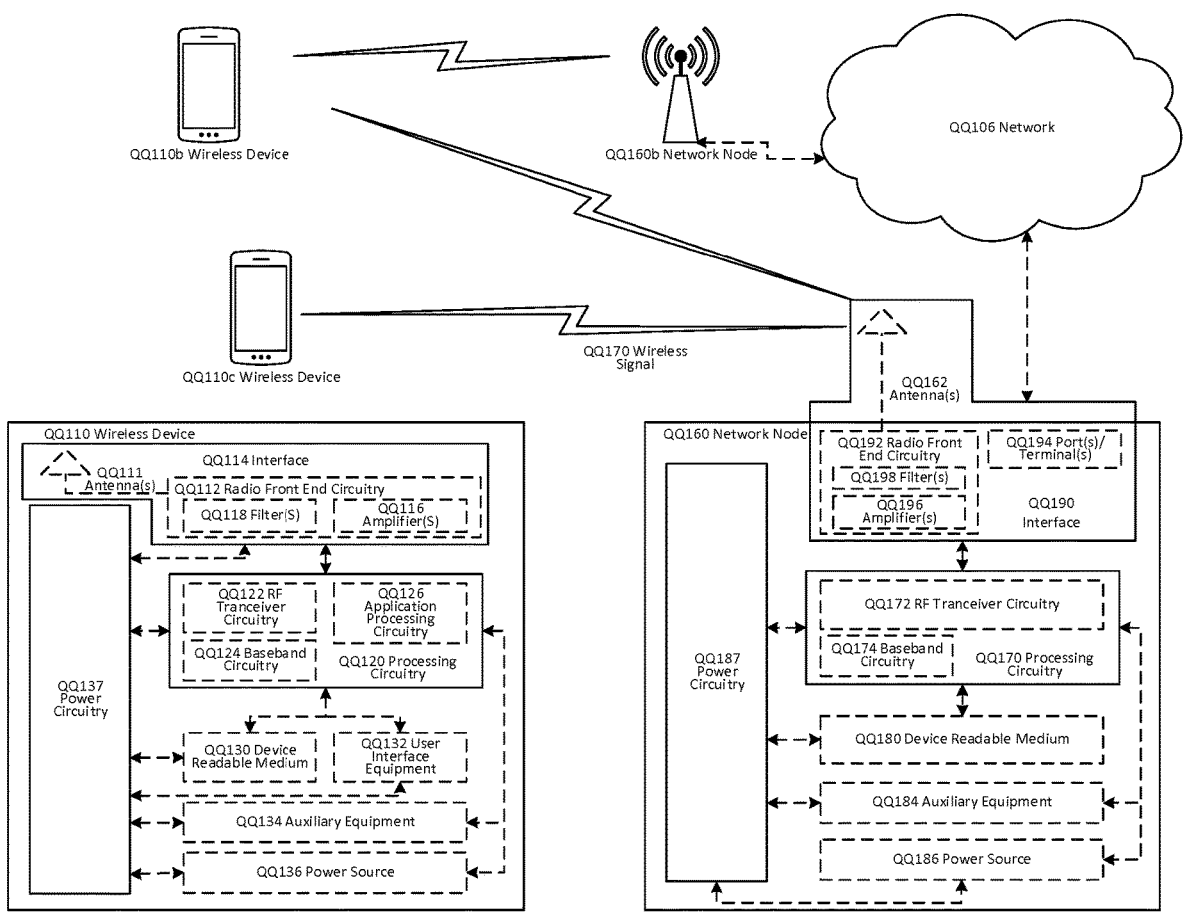
FIG. 4 shows an example of a wireless network.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 4 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 5:
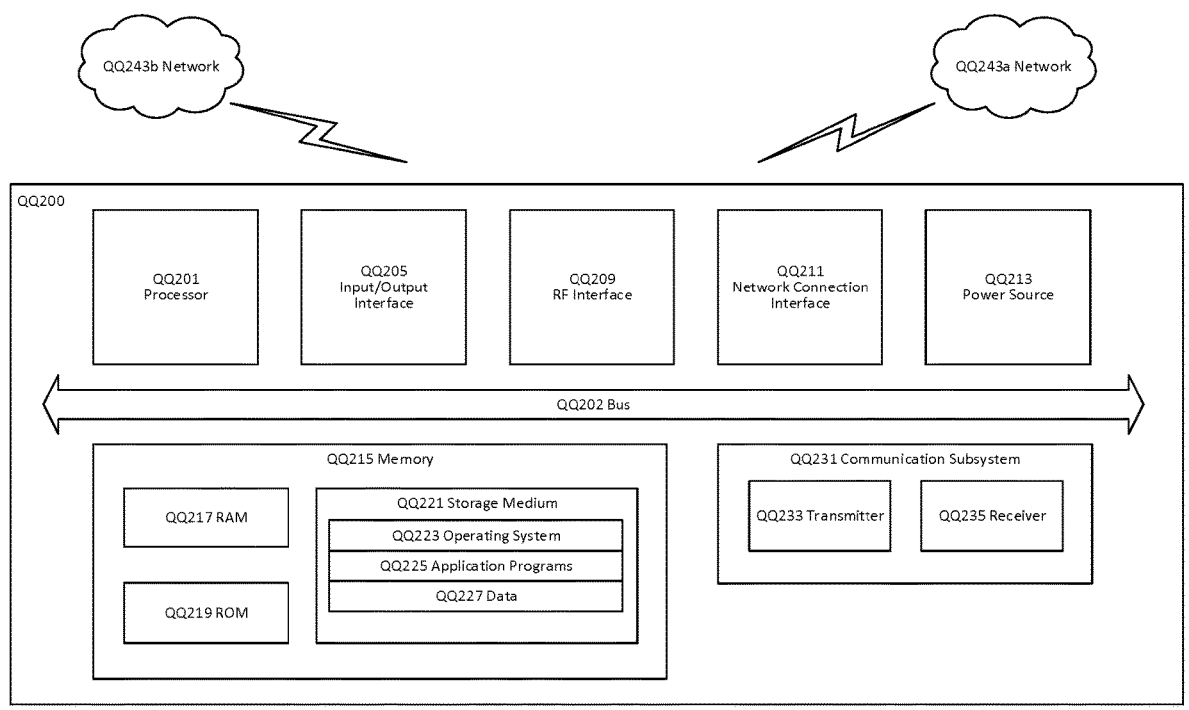
FIG. 5 illustrates one embodiment of a User Equipment (UE) in accordance with various aspects described herein.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 5, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 6:
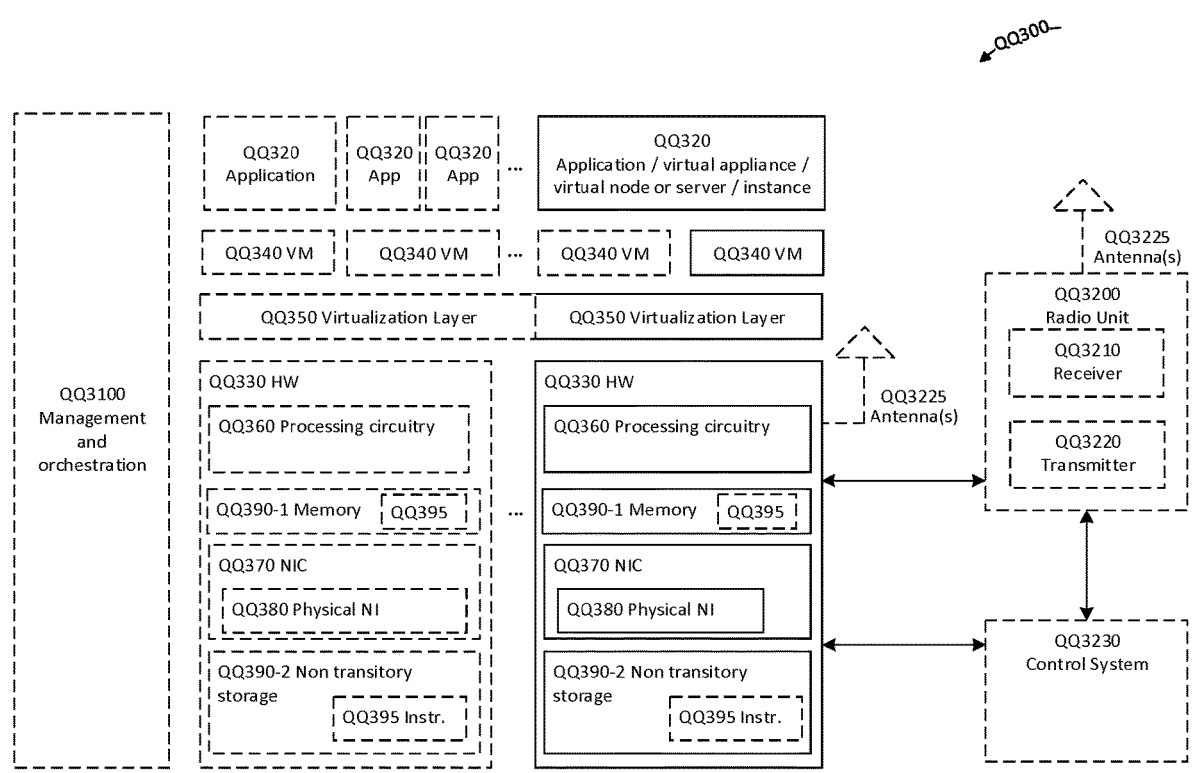
FIG. 6 is a schematic block diagram illustrating a virtualization environment.

FIG. 6 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 6, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 6.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 7:
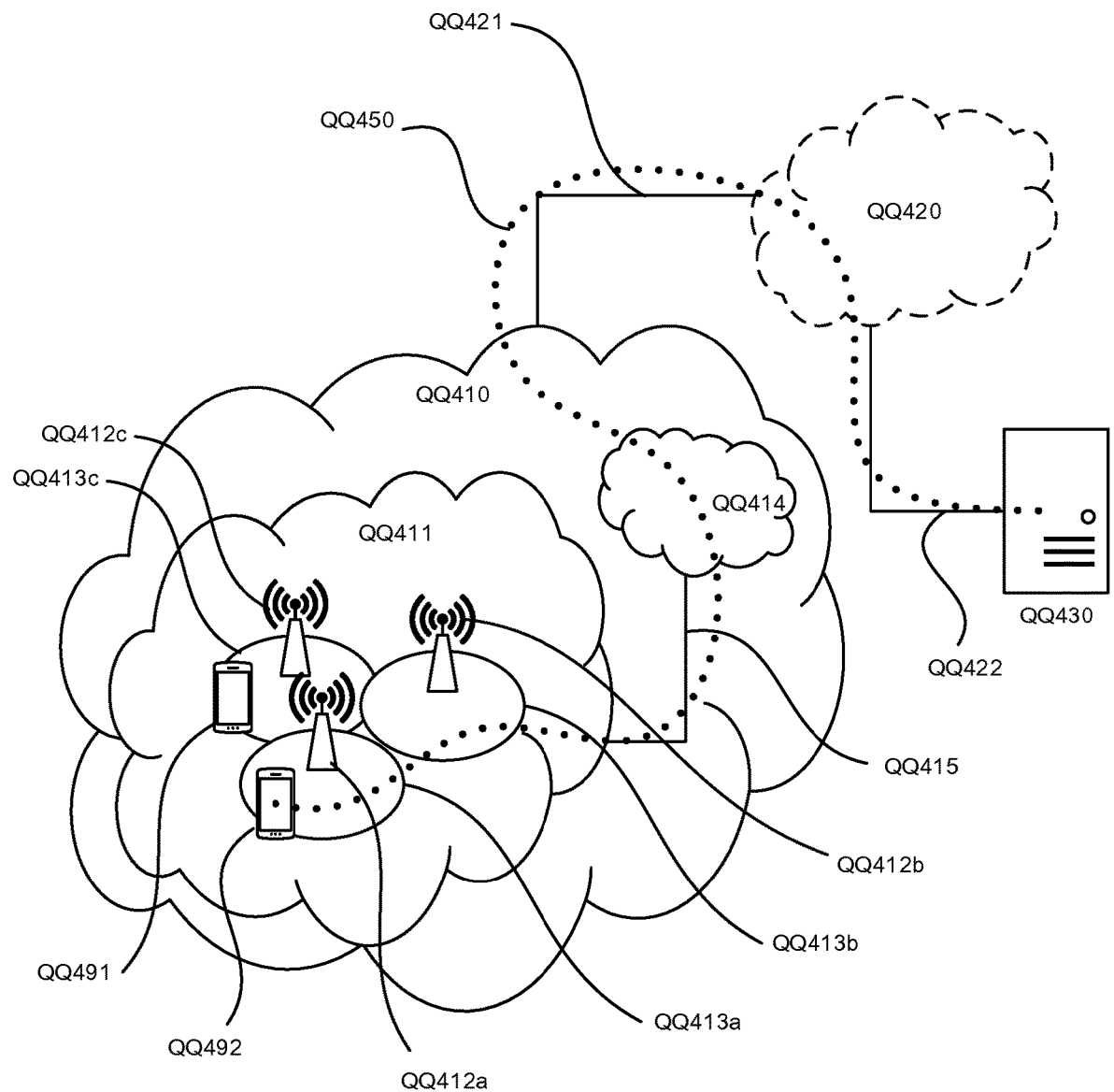
FIG. 7 illustrates an example of a communication system.

With reference to FIG. 7, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 7 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 8. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 8) served by base station QQ520. Communication interface QQ526 may be configured to facilitate connection QQ560 to host computer QQ510. Connection QQ560 may be direct or it may pass through a core network (not shown in FIG. 8) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 8:
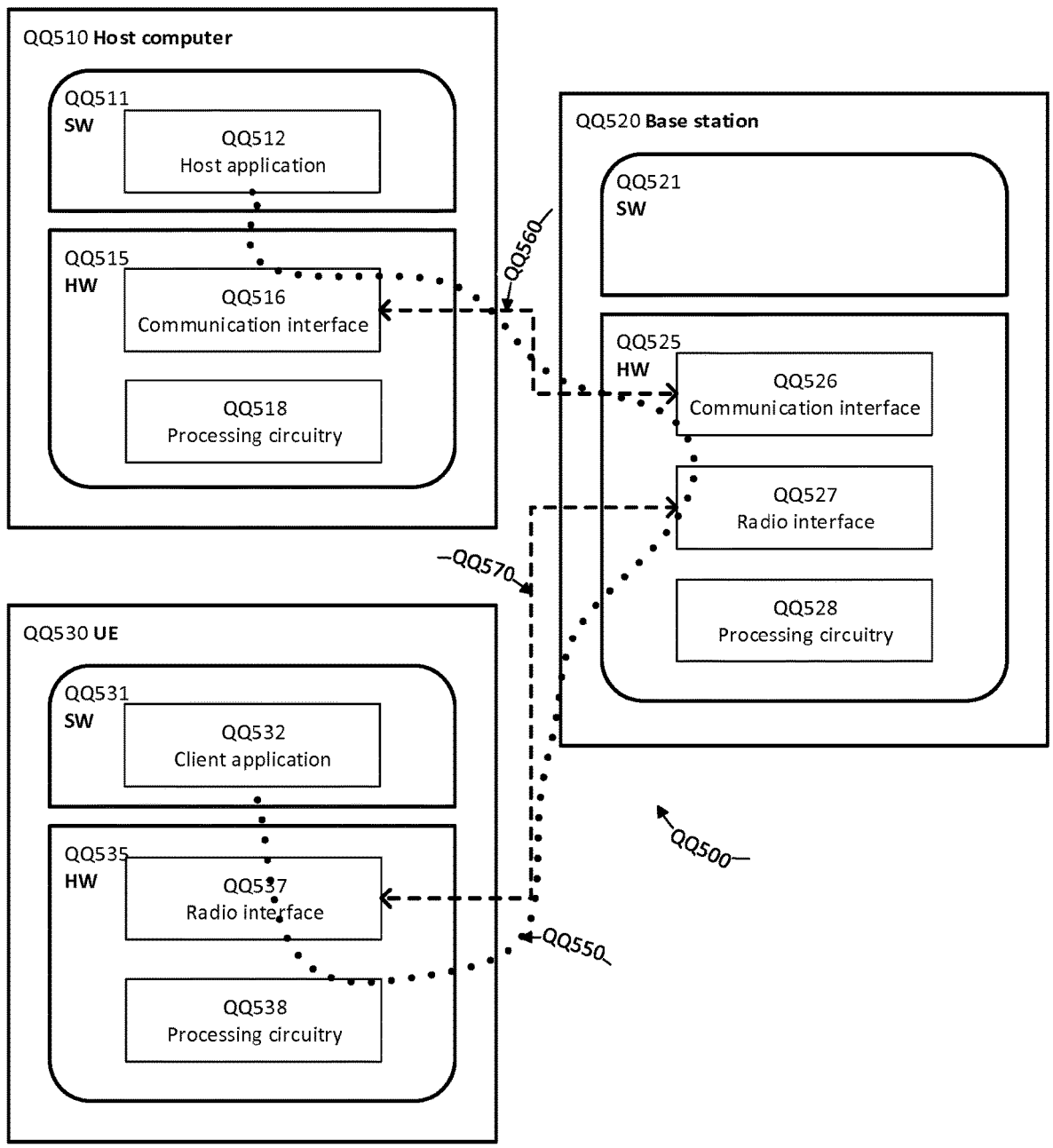
FIG. 8 illustrates an example of a communication system.

It is noted that host computer QQ510, base station QQ520 and UE QQ530 illustrated in FIG. 8 may be similar or identical to host computer QQ430, one of base stations QQ412a, QQ412b, QQ412c and one of UEs QQ491, QQ492 of FIG. 7, respectively. This is to say, the inner workings of these entities may be as shown in FIG. 8 and independently, the surrounding network topology may be that of FIG. 7.

In FIG. 8, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the efficiency of radio resource usage and thereby provide benefits such as reduced network congestion, improved battery lifetime, and/or other benefits.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 9:
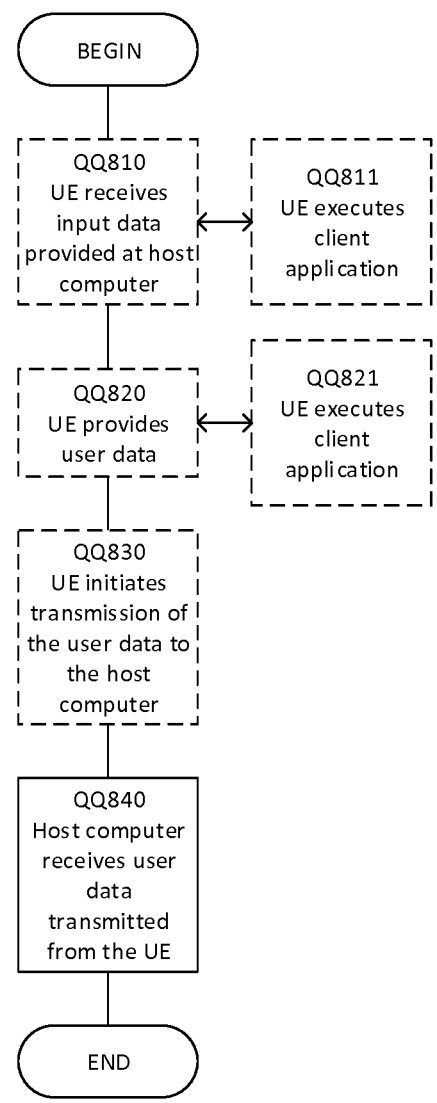
FIG. 9 is a flowchart illustrating a method implemented in a communication system.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 10:
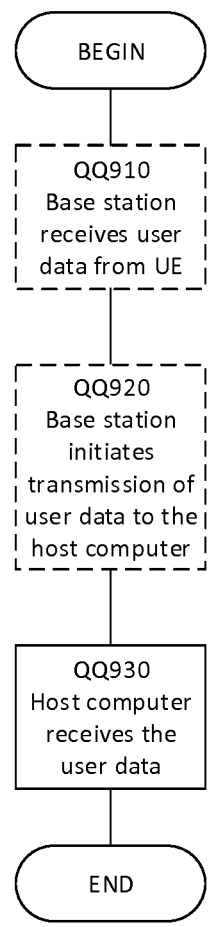
FIG. 10 is a flowchart illustrating a method implemented in a communication system.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 11:
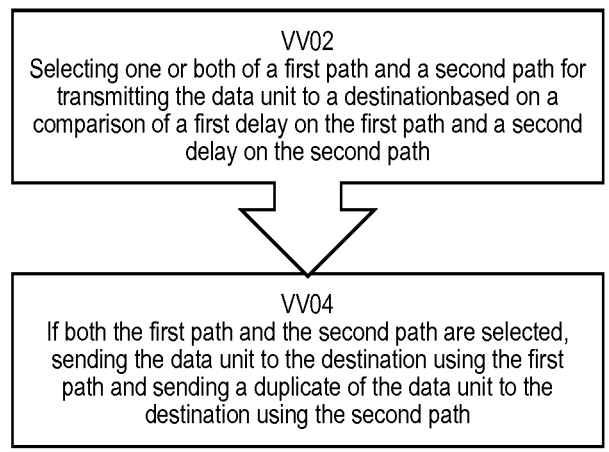
FIG. 11 depicts a method in accordance with particular embodiments.

FIG. 11 depicts a method in accordance with particular embodiments, the method begins at step VV02 with selecting one or both of a first path and a second path for transmitting the data unit to a destination based on a comparison of a first delay on the first path and a second delay on the second path. Next, at step VV04, the method comprises, if both the first path and the second path are selected, sending the data unit to the destination using the first path and sending a duplicate of the data unit to the destination using the second path.

Figure 12:
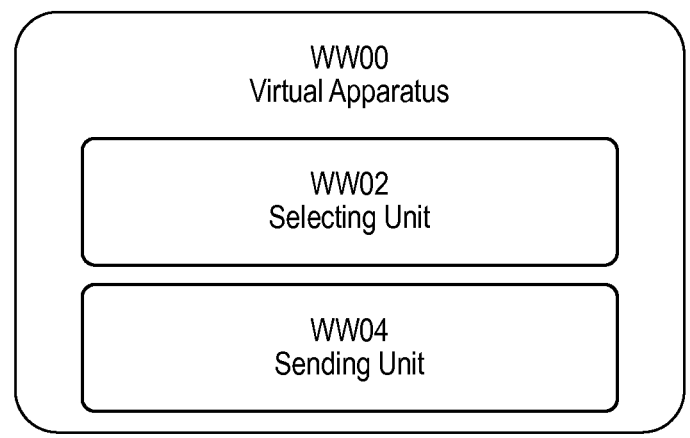
FIG. 12 illustrates a schematic block diagram of an apparatus in a wireless network.

FIG. 12 illustrates a schematic block diagram of an apparatus WW00 in a wireless network (for example, the wireless network shown in FIG. 4). The apparatus may be implemented in a wireless device or network node (e.g., wireless device QQ110 or network node QQ160 shown in FIG. 4). Apparatus WW00 is operable to carry out the example method described with reference to FIG. 11 and possibly any other processes or methods disclosed herein. It is also to be understood that the method of FIG. 11 is not necessarily carried out solely by apparatus WWOO. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Selecting Unit WW02, Sending Unit WW04, and any other suitable units of apparatus WW00 to perform corresponding functions according one or more embodiments of the present disclosure.

As illustrated in FIG. 12, apparatus WW00 includes Selecting Unit WW02 and Sending Unit WW04. Selecting unit WW02 is configured to select one or both of a first path and a second path for transmitting the data unit to a destination based on a comparison of a first delay on the first path and a second delay on the second path. Sending unit WW04 is configured to, if both the first path and the second path are selected, sending the data unit to the destination using the first path and sending a duplicate of the data unit to the destination using the second path.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device for transmitting a data unit, the method comprising:
    selecting one or both of a first path and a second path for transmitting the data unit to a destination based on a comparison of a first delay on the first path and a second delay on the second path; and
    if both the first path and the second path are selected, sending the data unit to the destination using the first path and sending a duplicate of the data unit to the destination using the second path.
2. The method of embodiment 1, wherein at least part of the first path and the second path use different physical layers.
3. The method of embodiment 1 or 2, wherein the first path and the second path use different carriers.
4. The method of any of embodiments 1 to 3, wherein sending the data unit comprises transmitting the data unit using a first carrier or a first physical layer, and sending a duplicate of the data unit comprises transmitting a duplicate of the data unit using a second carrier or a second physical layer.
5. The method of any of embodiments 1 to 4, wherein the first path includes a first physical layer to a first eNB or gNB, and the second path includes a second physical layer to the first eNB or gNB.
6. The method of any of embodiments 1 to 5, wherein the wireless device uses Carrier Aggregation (CA) to send the data unit using a first carrier and send the duplicate of the data unit using a second carrier.
7. The method of any of embodiments 1 to 4, wherein the first path includes a first physical layer to a first eNB or gNB, and the second path includes a second physical layer to a second eNB or gNB.
8. The method of any of embodiments 1 to 4 or 7, wherein the wireless device uses Dual Connectivity (DC) to send the data unit using a first carrier and send the duplicate of the data unit using a second carrier.
9. The method of embodiment 7 or 8, comprising, if one of the first path and the second path is selected, selecting one or both of a third path and the selected one of the first path and the second path for transmitting the data unit to the destination based on a comparison of a third delay on the third path and a selected path delay on the selected one of the first path and the second path.
10. The method of embodiment 9, comprising:
    selecting both the third path and the selected one of the first path and the second path if a difference between the third delay and the selected path delay is less than a further predetermined time difference or a further predetermined threshold;
    selecting one of the third path and the selected one of the first path and the second path if the difference between the third delay and the selected path delay is greater than the further predetermined time difference or the further predetermined threshold.
11. The method of embodiment 10, wherein selecting one of the third path and the selected one of the first path and the second path comprises selecting the third path if the third delay is less than the selected path delay, and selecting the selected one of the first path and the second path if the third delay is greater than the selected path delay.
12. The method of embodiment 10 or 11, comprising if both the third path and the selected one of the first path and the second path are selected, sending the data unit to the destination using the selected one of the first path and the second path, and sending a duplicate of the data unit to the destination using the third path.
13. The method of any of embodiments 10 to 12, comprising if one of the third path and the selected one of the first path and the second path are selected, sending the data unit to the destination using the selected path.
14. The method of any of embodiments 9 to 13, wherein the selected path delay is the first delay if the selected one of the first path and the second path is the first path, and the second delay if the selected one of the first path and the second path is the second path.
15. The method of embodiment 7 or 8, comprising if one of the first path and the second path is selected, sending the data unit to the destination using the selected one of the first path and the second path, and sending a duplicate of the data unit to the destination using a third path.

16. The method of embodiment 15, wherein the third path and the selected one of the first path and the second path are aggregated carriers using Carrier Aggregation (CA).
17. The method of any of embodiments 1 to 16, comprising:
    selecting both the first path and the second path if a difference between the first delay and the second delay is less than a predetermined time difference or a predetermined threshold;
    selecting one of the first path and the second path if the difference between the first delay and the second delay is greater than the predetermined time difference or the predetermined threshold.
18. The method of embodiment 17, wherein selecting one of the first path and the second path comprises selecting the first path if the first delay is less than the second delay, and selecting the second path if the first delay is greater than the second delay.
19. The method of any of embodiments 1 to 18, wherein the first delay includes an estimate of delay on the first path due to RLC or HARQ retransmission on the first path, and the second delay includes an estimate of delay on the second path due to RLC or HARQ retransmission on the second path.
20. The method of embodiment 19, comprising determining the estimate of delay on the first path based on an average number of retransmissions for data units on the first path during a first time period, and determining the estimate of delay on the second path based on an average number of retransmissions for data units on the second path during a second time period.
21. The method of any of embodiments 1 to 18, comprising determining the first delay and the second delay based on an average number of retransmissions for data units on the first path and the second path during a first time period.
22. The method of any of embodiments 1 to 21, wherein the first delay includes an estimate of a midhaul delay on the first path, and/or the second delay includes an estimate of a midhaul delay on the second path.
23. The method of any of embodiments 1 to 22, comprising determining the first delay and the second delay based on feedback from the destination and/or one or more intermediate nodes between the wireless device and the destination.
24. The method of embodiment 23, wherein the one or more intermediate nodes comprise an eNB or gNB.
25. The method of embodiment 23 or 24, comprising receiving the feedback from or via a RLC or PDCP layer.
26. The method of any of embodiments 1 to 25, comprising estimating a first SNR, SINR and/or BLER for the first path and a second SNR, SINR and/or BLER for the second path, and if one of the first path and the second path is selected:
    if the first path is selected, sending a duplicate of the data unit on the second path if the first SNR and/or SINR is lower than the second SNR and/or SINR, and/or the first BLER is higher than the second BLER; and
    if the second path is selected, sending a duplicate of the data unit on the first path if the first SNR and/or SINR is higher than the second SNR and/or SINR, and/or the first BLER is lower than the second BLER.
27. The method of any of embodiments 1 to 25, comprising, if one of the first path and the second path is selected, sending the data unit to the destination using the selected one of the first path and the second path.
28. The method of any of embodiments 1 to 27, wherein the first delay is an estimated delay on the first path and/or the second delay is an estimated delay on the second path.
29. The method of any of embodiments 1 to 28, wherein the first delay includes a queueing delay and/or a processing delay on the first path, and/or the second delay includes a queueing delay and/or a processing delay on the second path.
30. The method of any of embodiments 1 to 29, wherein the data unit comprises a PDCP PDU.
31. The method of any of the previous embodiments, further comprising:
    providing user data; and
    forwarding the user data to a host computer via the transmission to the base station.

Group B Embodiments

32. A method performed by a base station for receiving a data unit, the method comprising:
    based on a comparison of a first delay on a first path and a second delay on a second path, receiving the data unit from a wireless device on one of the first path and the second path, or receiving the data unit from the wireless device on the first path and receiving a duplicate of the data unit on the second path.
33. The method of embodiment 32, wherein at least part of the first path and the second path use different physical layers.
34. The method of embodiment 32 or 33, wherein the first path and the second path use different carriers.
35. The method of any of embodiments 32 to 34, wherein receiving the data unit comprises receiving the data unit over a first carrier or a first physical layer, and receiving a duplicate of the data unit comprises receiving a duplicate of the data unit using a second carrier or a second physical layer.
36. The method of embodiment 35, wherein the first carrier and the second carrier are aggregated carriers using Carrier Aggregation (CA).
37. The method of any of embodiments 32 to 36, comprising:
    receiving the data unit on the first path and receiving a duplicate of the data unit on the second path if a difference between the first delay and the second delay is less than a predetermined time difference or a predetermined threshold;
    receiving the data unit on one of the first path and the second path if the difference between the first delay and the second delay is greater than the predetermined time difference or the predetermined threshold.
38. The method of embodiment 37, wherein receiving the data unit on one of the first path and the second path comprises receiving the data unit on the first path if the first delay is less than the second delay, and receiving the data unit on the second path if the first delay is greater than the second delay.
39. The method of any of embodiments 32 to 38, wherein the first delay includes an estimate of delay on the first path due to RLC or HARQ retransmission on the first path, and the second delay includes an estimate of delay on the second path due to RLC or HARQ retransmission on the second path.

40. The method of embodiment 39, wherein the estimate of delay on the first path is based on an average number of retransmissions for data units on the first path during a first time period, and the estimate of delay on the second path is based on an average number of retransmissions for data units on the second path during a second time period.

41. The method of any of embodiments 32 to 40, wherein the first delay and the second delay are based on an average number of retransmissions for data units on the first path and the second path during a first time period.

42. The method of any of embodiments 32 to 41, wherein the first delay includes an estimate of a midhaul delay on the first path, and/or the second delay includes an estimate of a midhaul delay on the second path.

43. The method of any of embodiments 32 to 42, wherein the first delay and the second delay are based on feedback provided to the wireless device.

44. The method of embodiment 43, comprising providing the feedback to the wireless device from or via a RLC or PDCP layer.

45. The method of any of embodiments 32 to 44, wherein the first delay is an estimated delay on the first path and/or the second delay is an estimated delay on the second path.

46. The method of any of embodiments 32 to 45, wherein the first delay includes a queueing delay and/or a processing delay on the first path, and/or the second delay includes a queueing delay and/or a processing delay on the second path.

47. The method of any of embodiments 32 to 46, wherein the data unit comprises a PDCP PDU.

48. The method of any of the previous embodiments, further comprising:
obtaining user data; and
forwarding the user data to a host computer or a wireless device.

Group C Embodiments

49. A wireless device for transmitting a data unit, the wireless device comprising:
processing circuitry configured to perform any of the steps of any of the Group A embodiments; and
power supply circuitry configured to supply power to the wireless device.

50. A base station for receiving a data unit, the base station comprising:
processing circuitry configured to perform any of the steps of any of the Group B embodiments;
power supply circuitry configured to supply power to the base station.

51. A user equipment (UE) for transmitting a data unit, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

52. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

53. The communication system of the previous embodiment further including the base station.

54. The communication system of the previous 2 embodiments, further including the UE, wherein the UE is configured to communicate with the base station.

55. The communication system of the previous 3 embodiments, wherein:
the processing circuitry of the host computer is configured to execute a host application, thereby providing the user data; and
the UE comprises processing circuitry configured to execute a client application associated with the host application.

56. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

57. The method of the previous embodiment, further comprising, at the base station, transmitting the user data.

58. The method of the previous 2 embodiments, wherein the user data is provided at the host computer by executing a host application, the method further comprising, at the UE, executing a client application associated with the host application.

59. A user equipment (UE) configured to communicate with a base station, the UE comprising a radio interface and processing circuitry configured to performs the of the previous 3 embodiments.

60. A communication system including a host computer comprising:
processing circuitry configured to provide user data; and
a communication interface configured to forward user data to a
wherein the UE comprises a radio interface and processing circuitry, the UE's components configured to perform any of the steps of any of the Group A embodiments.

61. The communication system of the previous embodiment, wherein the cellular network further includes a base station configured to communicate with the UE.
62. The communication system of the previous 2 embodiments, wherein:
    the processing circuitry of the host computer is configured to execute a host application, thereby providing the user data; and
    the UE's processing circuitry is configured to execute a client application associated with the host application.
63. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.
64. The method of the previous embodiment, further comprising at the UE, receiving the user data from the base station.
65. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.
66. The communication system of the previous embodiment, further including the UE.
67. The communication system of the previous 2 embodiments, further including the base station, wherein the base station comprises a radio interface configured to communicate with the UE and a communication interface configured to forward to the host computer the user data carried by a transmission from the UE to the base station.
68. The communication system of the previous 3 embodiments, wherein:
    the processing circuitry of the host computer is configured to execute a host application; and
    the UE's processing circuitry is configured to execute a client application associated with the host application, thereby providing the user data.
69. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
70. A method implemented in a communication system including a host computer, a base station and a user equipment (UE), the method comprising:
    at the host computer, receiving user data transmitted to the base station from the UE, wherein the UE performs any of the steps of any
71. The method of the previous embodiment, further comprising, at the UE, providing the user data to the base station.
72. The method of the previous 2 embodiments, further comprising:
    at the UE, executing a client application, thereby providing the user data to be transmitted; and
    at the host computer, executing a host application associated with the client application.
73. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
74. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
75. The communication system of the previous embodiment further including the base station.
76. The communication system of the previous 2 embodiments, further including the UE, wherein the UE is configured to communicate with the base station.
77. The communication system of the previous 3 embodiments, wherein:
    the processing circuitry of the host computer is configured to execute a host application;
    the UE is configured to execute a client application associated with the host application, thereby providing the user data to be received by the host computer.
78. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
79. The method of the previous embodiment, further comprising at the base station, receiving the user data from the UE.
80. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BLER Block Error Rate
CA Carrier Aggregation CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DC Dual Connectivity
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Protocol Data Unit
PGW Packet Gateway
PHICH Physical Hybrid-ARQ Indicator Channel
PHY Physical layer entity
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
RLC Radio Link Control
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SINR Signal to Interference plus Noise Ratio
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:
1. A method, performed by a wireless device, for transmitting a Packet Data Convergence Protocol (PDCP) protocol data unit (PDU), the method comprising:
selecting one or both of a first path and a second path for transmitting the PDU to a destination based on a comparison of a first delay on the first path and a second delay on the second path, wherein the first delay includes an estimate of delay on the first path due to Radio Link Control (RLC) or Hybrid Automatic Repeat Request (HARQ) retransmission on the first path, and/ or the second delay includes an estimate of delay on the second path due to RLC or HARQ retransmission on the second path;
determining the estimate of the first delay on a first path based on an average number of retransmissions for PDUs on the first path during a first time period;
determining the estimate of the second delay on the second path based on an average number of retransmissions for PDUs on the second path during a second time period; and
if both the first path and the second path are selected, using Carrier Aggregation (CA) or Dual Connectivity (DC) to send the PDU to the destination on the first path using a first carrier and a duplicate of the PDU to the destination on the second path using a second carrier.

2. The method of claim 1, wherein at least part of the first path and the second path use different physical layers and/or the first path and the second path use different carriers.

3. The method of claim 1, wherein:
the first delay comprises a transmission delay of the PDCP PDU from a point where it becomes available at a PDCP layer until it is delivered by a lower layer via the first path; and
the second delay comprises a transmission delay of the PDCP PDU from a point where it becomes available at the PDCP layer until it is delivered by the lower layer via the second path.

4. The method of claim 1, wherein:
the first path includes a first physical layer to a first eNB or gNB; and
the second path includes a second physical layer to the first eNB or gNB.

5. The method of claim 1:
wherein the wireless device uses DC to send the PDU using the first carrier and send the duplicate of the PDU using the second carrier;
further comprising, if one but not both of the first path and the second path are selected, selecting a third path and/or the selected one of the first path and the second path for transmitting the PDU to the destination based on a comparison of a third delay on the third path and a selected path delay on the selected one of the first path and the second path.

6. The method of claim 5, wherein the method comprises:
selecting both the third path and the selected one of the first path and the second path if a difference between the third delay and the selected path delay is less than a further predetermined time difference or a further predetermined threshold; and
selecting one of the third path and the selected one of the first path and the second path if the difference between the third delay and the selected path delay is greater than the further predetermined time difference or the further predetermined threshold.

7. The method of claim 6, wherein selecting one of the third path and the selected one of the first path and the second path comprises selecting the third path if the third delay is less than the selected path delay, and selecting the selected one of the first path and the second path if the third delay is greater than the selected path delay.

8. The method of claim 6, wherein the method comprises, if both the third path and the selected one of the first path and the second path are selected, sending the PDU to the destination using the selected one of the first path and the second path, and sending the duplicate of the PDU to the destination using the third path.

9. The method of claim 6, wherein the method comprises, if one but not both of the third path and the selected one of the first path and the second path are selected, sending the PDU to the destination using the selected path.

10. The method of claim 5:
wherein the selected path delay is the first delay if the selected one of the first path and the second path is the first path; and
wherein the selected path delay is the second delay if the selected one of the first path and the second path is the second path.

11. The method of claim 1, wherein the method comprises:
selecting both the first path and the second path if a difference between the first delay and the second delay is less than a predetermined time difference or a predetermined threshold;
selecting one of the first path and the second path if the difference between the first delay and the second delay is greater than the predetermined time difference or the predetermined threshold.

12. The method of claim 11, wherein the selecting one of the first path and the second path comprises selecting the first path if the first delay is less than the second delay, and selecting the second path if the first delay is greater than the second delay.

13. The method of claim 1, wherein the method comprises determining the first delay and the second delay based on an average number of retransmissions for PDUs on the first path and the second path during a first time period.

14. The method of claim 1, wherein the first delay includes an estimate of a midhaul delay on the first path, and/or the second delay includes an estimate of a midhaul delay on the second path.

15. The method of claim 1, wherein the method comprises determining the first delay and the second delay based on feedback from the destination and/or one or more intermediate nodes between the wireless device and the destination.

16. The method of claim 1, wherein the method comprises:
estimating a first Signal to Noise Ratio (SNR), Signal to Interference plus Noise Ratio (SINR), and/or Block Error Rate (BLER) for the first path;
estimating a second SNR, SINR, and/or BLER for the second path;
if one of the first path and the second path is selected:
if the first path is selected, sending the duplicate of the PDU on the second path if the first SNR and/or SINR is lower than the second SNR and/or SINR, and/or the first BLER is higher than the second BLER; and
if the second path is selected, sending the duplicate of the PDU on the first path if the first SNR and/or SINR is higher than the second SNR and/or SINR, and/or the first BLER is lower than the second BLER.

17. A non-transitory computer readable recording medium storing a computer program product for controlling a wireless device for transmitting a Packet Data Convergence Protocol (PDCP) protocol data unit (PDU), the computer program product comprising program instructions which, when run on processing circuitry of the wireless device, causes the wireless device to:
select a first path and/or a second path for transmitting the PDU to a destination based on a comparison of a first delay on the first path and a second delay on the second path, wherein the first delay includes an estimate of delay on the first path due to Radio Link Control (RLC)

or Hybrid Automatic Repeat Request (HARQ) retransmission on the first path, and/or the second delay includes an estimate of delay on the second path due to RLC or HARQ retransmission on the second path; and determine the estimate of the first delay on a first path based on an average number of retransmissions for PDUs on the first path during a first time period;

determine the estimate of the second delay on the second path based on an average number of retransmissions for PDUs on the second path during a second time period; and if both the first path and the second path are selected, use Carrier Aggregation (CA) or Dual Connectivity (DC) to send the PDU to the destination on the first path using a first carrier and a duplicate of the PDU to the destination on the second path using a second carrier.

18. A wireless device for transmitting a Packet Data Convergence Protocol (PDCP) protocol data unit (PDU), the wireless device comprising:

processing circuitry;

memory containing instructions executable by the processing circuitry whereby the wireless device is operative to:

select one or both of a first path and a second path for transmitting the PDU to a destination based on a comparison of a first delay on the first path and a second delay on the second path, wherein the first delay includes an estimate of delay on the first path due to Radio Link Control (RLC) or Hybrid Automatic Repeat Request (HARQ) retransmission on the first path, and/or the second delay includes an estimate of delay on the second path due to RLC or HARQ retransmission on the second path determining the estimate of the first delay on a first path based on an average number of retransmissions for PDUs on the first path during a first time period;

determining the estimate of the second delay on the second path based on an average number of retransmissions for PDUs on the second path during a second time period; and if both the first path and the second path are selected, use Carrier Aggregation (CA) or Dual Connectivity (DC) to send the PDU to the destination on the first path using a first carrier and a duplicate of the PDU to the destination on the second path using a second carrier.

* * * * *